United States Patent Office 3,291,988
Patented Dec. 13, 1966

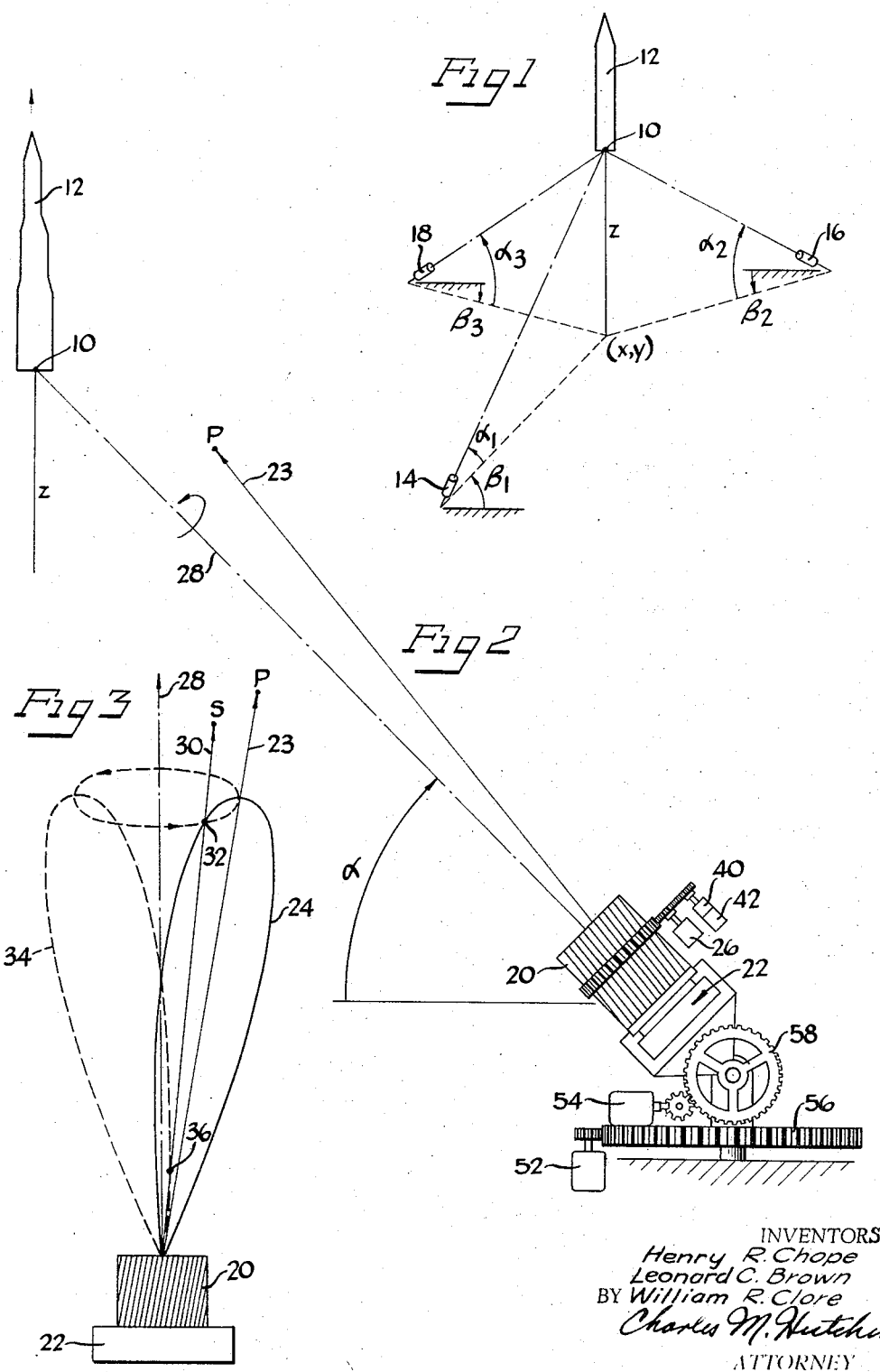

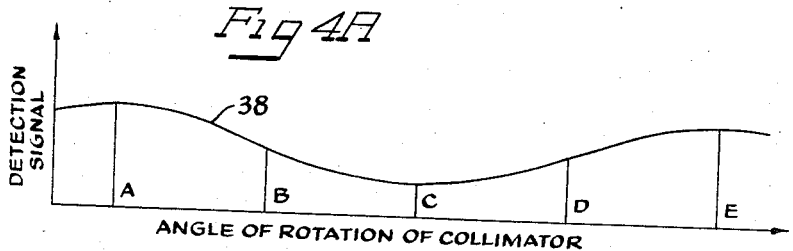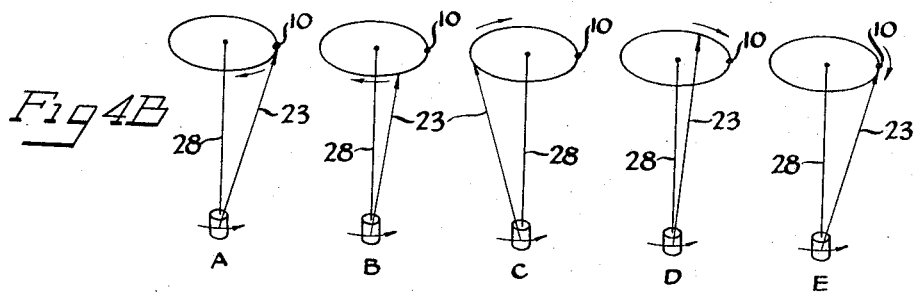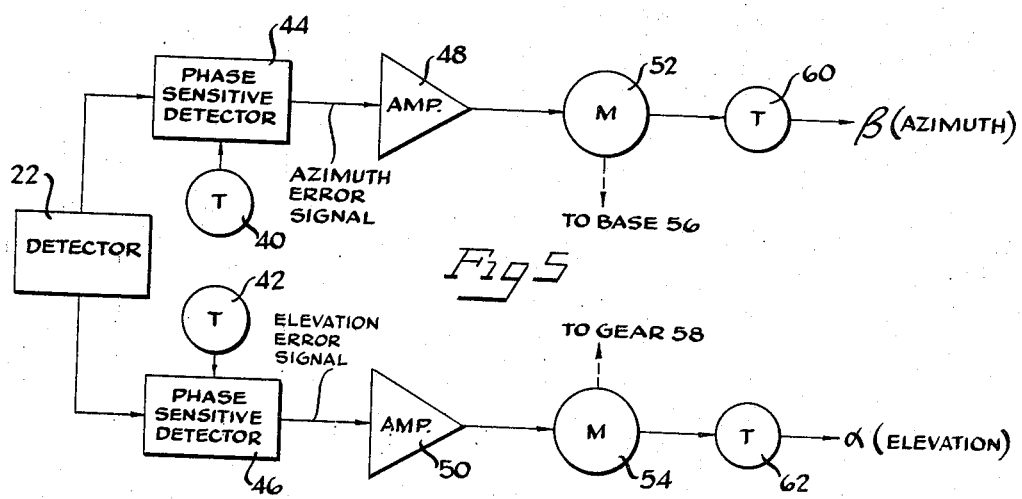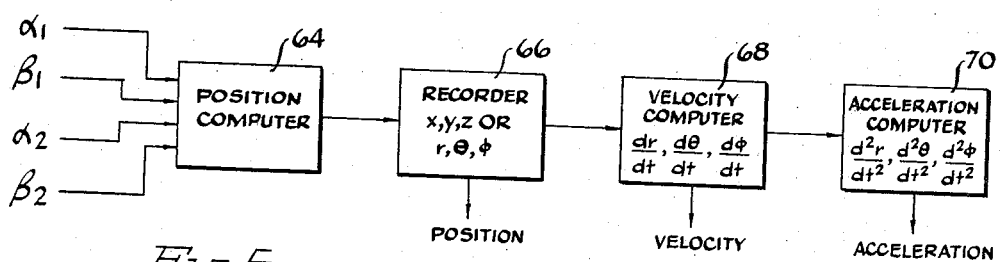

3,291,988
ALL-WEATHER THREE-COORDINATE POSITION INDICATING SYSTEM
Henry R. Chope, William R. Clore, and Leonard C. Brown, assignors to Industrial Nucleonics Corporation, a corporation of Ohio
Filed Apr. 8, 1963, Ser. No. 271,154
13 Claims. (Cl. 250—83.3)

This invention relates to a method and a system for fixing the position of an object located at some distance from a detection station. More particularly, it relates to an angular tracking system whereby the position of an object such as a missile is determined by measuring at a plurality of stations the direction of radiations emitted from a penetrative radiation source such as radioactive affixed to the object.

For various aerospace applications, it is necessary to track accurately or fix the position of a moving body such as a missile, which may be a rocket. In the past, this tracking has been achieved by radar, by Doppler ranging and by optical and infrared measurements. Radar and Doppler ranging are not accurate for short ranges or low velocity. In many operations, it is necessary that the missile be accurately tracked during the early part of its trajectory, particularly in the first thousand feet. Optical and infrared measurements are useful at short range and at low velocities; however, they require fair weather.

It has been suggested that a missile be located by measuring at a plurality of ground stations the intensity of penetrative radiations produced by radioactive material carried by the missile and computing the position of the missile from these measurements by triangulation. Such systems have required intense sources or very large detectors to achieve adequate accuracy. The present invention is based upon the discovery that greater accuracy can be achieved by measuring at a number of stations the direction from which the penetrative radiations are coming as an indication of the direction of the missile and by combining these measurements to derive separate indications of three coordinates identifying the instantaneous position of the missile in space relative to a reference datum. This has the additional advantage that, except for statistical fluctuations, the measurements are independent of source strength. Thus the system does not depend on measurements of radiation intensity nor does it require complicated adjustments for instrument calibration when the system is used with different missiles and sources. Further, the computer used can be the same as those previously uesd in optical tracking.

It is, therefore, the primary object of the present invention to provide a tracking system which has capability for accurately tracking an object such as a missile during the initial parts of its trajectory. It is a further object of the invention to track or locate an object under all weather conditions, particularly under weather conditions that would render optical tracking devices relatively useless. It is still another object to provide a system for tracking or fixing the position of a source of penetrative radiation, which system is substantially independent of source strength. It is still another object to provide a nuclear angular tracking system for tracking or fixing the position of a body carrying a source of penetrative radiation in which the tracking units determine the angular disposition of the body from each unit. Other objects and advantages will be apparent from consideration of the following description taken in connection with the drawings in which:

FIGURE 1 is a diagrammatic illustration of one form of the nuclear angular tracking system of the present invention, showing its geometry;

FIGURE 2 is an illustration, partly in elevation and partly diagrammatic, showing in greater detail one form of a tracking unit useful in the system shown in FIGURE 1;

FIGURE 3 is a diagrammatic illustration showing the operation of the tracking unit shown in FIGURE 2;

FIGURES 4A and 4B are another diagrammatic illustration showing the operation of the tracking unit shown in FIGURE 2;

FIGURE 5 is a block diagram of one form of servo system adapted for use in the system shown in FIGURE 1 to direct the axis of rotation of the collimator and indicate its direction; and FIGURE 6 is a block diagram of a computer that may be used in the system shown in FIGURE 1.

The present invention relates to a position indicating system and method, in particular for tracking a moving missile. The missile carries radioactive material emitting penetrating radiation. "Penetrating radiation," as used herein, refers to radiation penetrative of clouds and fog that is not capable of being readily focused like light and infrared. The penetrating radiations preferred for use in this invention are gamma rays and bremsstrahlung. A fixed detection system, such as the ground stations hereinafter described, simultaneously measures at least three separate planes in each of which lies the radioactive material. The system produces respective signals each indicative of one of these planes. A computer takes these signals and from them computes the instantaneous position of the missile. The computer provides an indication of this position which may be visual and is preferably provided as the three coordinates of a three dimensional coordinate system having a predetermined reference datum. The computer may also compute and indicate the instantaneous velocity or acceleration of the missile.

Although it is necessary to have but three separate planes to define a point in space, it is convenient to measure both azimuth and elevation at respective tracking stations, and it is, therefore, convenient to have two measurements of azimuth and two measurements of elevation. This provides additional information that increases the accuracy of measurement. Accuracy can be still further increased by adding additional tracking stations.

Referring now to FIGURE 1, there is shown a tracking arrangement wherein a radioactive source 10 that produces penetrating radiation is attached to a moving vehicle such as a missile 12. Three tracking units 14, 16, 18 located at respective tracking stations are illustrated. The function of each tracking unit is to obtain an elevation angle $\alpha$ and an azimuth angle $\beta$ relating the angular position of the source to arbitrary elevation and azimuth reference lines. Each tracking unit points toward the source, as will be explained below. The pointing position at each tracking station yields the elevation and azimuth angles. The reference for the azimuth angle illustrated in FIGURE 1 is an east-west line. The reference for the elevation angles is preferably a plane connecting the three tracking stations, which is preferably horizontal. Such reference planes and base lines are determined by appropriate surveying means prior to the actual tracking of a missile. Precise angular information from two stations will fix the position of the source and hence the missile. However, additional accuracy may be obtained by adding redundant information from additional tracking stations, three stations being shown in FIGURE 1. The tracking stations are preferably spaced apart so that the angles between the tracking planes are in the vicinity of 90° over a large portion of the trajectory being measured. Preferably they are spaced about 90° apart about the launching pad of the missile, and when but two stations are used, one is preferably aligned north and south with the launching pad and the other aligned east and west. This simplifies the computer requirements.

FIGURE 2 illustrates a preferred form of tracking unit 14. The other tracking units may be the same. A basic feature of the tracking unit is the collimator 20. The collimator is before a radiation detector 22 and restricts the direction whence the penetrating radiation reaches the detector. The collimator thus defines a preferred direction whence radiation can reach the detector. As illustrated, the collimator may take the form of a plurality of hollow tubes made of shielding material that serves to stop the penetrating radiation from the radioactive source 10. The tubes are mounted parallel to one another and thus pass radiation arriving substantially only from the direction in which the tubes are pointed. For example, if the source were located at point P rays traveling from it would tend to pass through the collimating tubes. The radiation detector 22 is located behind the collimator and detects substantially only such gamma rays as pass through the collimator 20. The detector 22 is preferably a scintillation counter and may include the conventional crystal, photomultiplier, power supply and discriminator. The preferred radiation sources emit gamma rays or Bremsstrahlung. Such radiation is not continuous but is statistical. This radiation cannot be focused in the manner of light. It is emitted from the source in all directions and upon interacting wtih matter may result in scattered radiation, some of which may reach the detector 22 through the collimator 20. If a source of gamma rays were to be located at the point P the gamma radiation arriving at the collimator would be from all directions with a maximum from the direction of point P. Thus, were the collimator moved about until a maximum number of gamma rays passed the collimator to reach the detector 22, the axis of the collimator tubes would then be pointing in the direction of the source. Although the direction of the missile could be found in this manner, the diffusion of the gamma radiation is such that the directional response of the collimator is quite flat at the point where the collimator is pointing at the source. That is, at the point where the collimator is aligned with the source, movement of the collimator makes very little change in the radiation passing through it. This may be better illustrated in FIGURE 3 in which point P is again in the preferred direction, i.e., the direction of the collimating tubes, and may be said to be on the collimator axis 23. Curve 24 is the response curve indicating the radiation detection signals produced by detector 22 as a source is moved transversely to the collimator axis. As can be seen, the detection signal changes very little for displacements near the collimator axis but changes markedly at some distance from the axis. In a preferred embodiment of the present invention, the collimator 20 is caused to rotate by a collimator drive motor 26. The collimator is caused to rotate about an axis of rotation 28. The axis of rotation is displaced from the axis of the collimator, preferably by a small angle sufficient to place a sharply changing portion of the curve 24 on the axis of rotation.

As the collimator is rotated about the axis of rotation, the direction of the collimator axis relative to the source changes, except when the source lies along the axis of rotation. As the axis of the collimator gets nearer and farther away from the source, the radiation passing the collimator gets greater and less, respectively. At the same time, the detection signals get correspondingly greater or less. For example, where the source is located at point S in a direction 30, the response of the detector will be as indicated at point 32 on response curve 24; whereas if the collimator were to be rotated 180°, the response curve would be shown by curve 34 and the detection signal would correspond to point 36 on curve 34. The difference between the two signals would reflect the displacement of the source from the axis of rotation. The shape of the collimation pattern of the collimator 20 is not critical, particularly on the outer side. The important requirement is that the response curve be sloping appreciably in the vicinity of the axis of rotation so as to produce marked differences between signals as the collimator rotates, providing a relatively small response on one side of the axis and a relatively large response on the other side of the axis.

FIGURE 4 illustrates the variation in the detection signal with rotation of the collimator. The curve 38 in FIGURE 4A illustrates the signal amplitude. In FIGURE 4B is shown the relative positions of the axis of rotation 28 and collimator axis 23 relative to the source 10 at various times A, B, C, D, E. As illustrated, the signal is at a maximum when the collimator axis is pointed most nearly in the direction of the source and at a minimum when the collimator is 180° from the position of maximum signal.

As the collimator rotates about the axis of rotation the detection signal will have two components, an azimuth component and an elevation component. The signal can be resolved into its components by comparison with a reference signal or signals derived from reference signal generators 40 and 42 driven by the collimator drive motor 26, as shown in FIGURE 2. Reference signal generator 40 provides an azimuth reference signal, and reference signal generator 42 provides an elevation reference signal. In its preferred form, the azimuth reference signal is 90° out of phase with the elevation reference signal.

As shown in FIGURE 5, the output of detector 22 is applied to a phase sensitive detector 44 where it is correlated with a signal from azimuth reference signal generator 40 to provide an output signal related to the azimuth dependent component of the detection signal; that is, the output signal of phase sensitive detector 44 is systematically related to the azimuth displacement of the source from the axis of rotation; this displacement may be referred to as the azimuth error and the signal as the azimuth error signal. The sense of the error signal indicates on which side of the axis of rotation the source lies. This error signal is amplified by an amplifier 48 and used to drive an azimuth motor 52, shown also in FIGURE 2, which drives the mounting base 56 of the tracking unit to turn the tracking unit in such direction as to move the axis of rotation azimuthally to reduce the output of the phase sensitive detector 44, thereby directing the tracking unit azimuthally toward the source 10. At the same time, the output of detector 22 is applied to a phase sensitive detector 46, where it is correlated with the output of the elevation reference signal generator 42 to derive an output error signal dependent upon the elevation error of the tracking unit. This error signal is similarly amplified by an amplifier 50 and used to drive elevation drive motor 54 which turns a gear 58 to move the tracking unit elevationally so as to reduce the signal from the phase sensitive detector 46, thereby reducing the elevational error, i.e., deviation of the axis of rotation from the direction of the source. At the same time, the azimuth motor 52 drives an azimuth angle transmitter 60 to produce a signal indicative of the azimuth angle of the base and hence the azimuth angle of the axis of rotation 28. Inasmuch as the servo system keeps the axis of rotation pointing at the source, this azimuth angle transmitter 60 produces a signal indicative of the azimuth angle $\beta$ of the source relative to the tracking unit. At the same time, the elevation drive motor 54 drives a similar elevation angle transmitter 62 which provides a signal indicative of the elevation angle $\alpha$ of the source relative to the tracking unit.

It should be pointed out that radioactive decay is a statistical process. Gamma rays are not emitted continuously but at random, although the statistical variations average out over a period of time. The detection signal as depicted by curve 38 in FIGURE 4A is smooth. In fact, there are statistical fluctuations in the signal which can be made small by slow rotation of the collimator and a long time constant or by high counting rates as can be achieved by using large sources of radioactivity and very sensitive detectors. In practice, however, it is necessary only that the phase sensitive detectors 44, 46 indicate weather the detection signal is ahead or behind the phase of the respective reference signal, i.e., whether the axis of collimation is too high or too low or is too far to the left or to the right.

It is apparent that the phase relationship may be resolved by any one of several equivalent schemes. In one particularly simple and effective arrangement, the function of the reference signal generators 40 and 42 is performed by an electronic or mechanical commutator device which effectively divides the collimator rotation into the conventional four quadrants. The commutator arrangement feeds the radiation detector output signals selectively into four signal channels, each corresponding to selected portions of the total collimator rotation angle.

With the commutator system, the function of each phase sensitive detector 42 or 44 may be performed by a pair of accumulators, such as count-rate meters, and a difference circuit. Thus phase sensitive detector 44 may include a first accumulator for the radiation detector signals received in the first and fourth quadrants of collimator rotation, and a second accumulator for the signals received in the second and third quadrants. The difference between the signal accumulated in the first accumulator and the signal accumulated in the second accumulator constitutes the azimuth error signal applied to servo amplifier 48.

Similarly the phase sensitive detector 46 may include a first accumulator for the signals received in the first and second quadrants and a second accumulator for the radiation detector signals received in the third and fourth quadrants, whereby the difference between the accumulated signals constitutes the elevation error signal applied to servo amplifier 50.

Thus, each of the azimuth and elevation control systems simply determines in which half of a collimator rotation cycle more radiation is detected, and this information is accumulated over a number of cycles to average out statistical variations.

Geometrical principles hold that three coordinates define a position in space. These coordinates may be the identification of three planes containing the point, as three intersecting planes intersect in but a single point so long as all three are not collinear. In the preferred form of this invention, the rotating collimator is positioned by the servo systems so that its axis of rotation points at the source on the missile. This defines a line. This line may be defined by identifying two planes intersecting on this line. It is to this end that the angles of displacement of the collimator in two orthogonal directions are determined. Although separate tracking units could be used to identify each of three planes, with the rotating collimator of the preferred form of the invention, there is sufficient information to identify two planes with each unit.

In actual practice, the directing of the tracking unit involves controlled motion in two planes. The detection unit comprising the detector 22 and the rotating collimator 20 are moved in elevation by motor 54 and in azimuth by motor 52. The reference signal generators, which may put out mechanical signals, as to a commutator, are preferably oriented to be in phase with the axis of rotation of the elevation and azimuth motions, respectively. Thus, the detection signals may be related to respective phase reference signals and hence related to the respective elevation and azimuth directions.

The axis of rotation of the collimator and the reference signal generators define two planes in each of which lies the axis of rotation of the collimator. The azimuth plane is vertical and the elevation plane is orthogonal thereto. The phase sensitive detector 44 determines whether or not more radiation is being detected when the collimator axis is to the left or the right of this plane. The amplified output of the phase sensitive detector drives the servo motor 52 to turn the detection unit azimuthally to the point where equal radiation signals are derived from the respective sides of the azimuth plane; than the resulting balanced input to phase sensitive detector 44 produces no output, and the azimuth motor 52 stops. At this point, the source on the missile lies in the azimuth plane, and the output of the azimuth angle transmitter 60 corresponds to an azimuth angle $\beta$ defining one of the three planes required to define the position of the missile. Similarly, the output of the elevation angle transmitter 62, corresponds to an elevational angle $\alpha$ defining a second of the three planes.

Thus, a signal indicating one identifying plane, e.g., the azimuth, is determined by moving the axis of rotation until equal detection signals are obtained for two portions of the rotation cycle of the collimator, these portions being 180° out of phase. A signal indicating a second identifying plane, e.g., the elevation, is determined by moving the axis of rotation until equal detection signals are obtained for two other portions of the rotation cycle of the collimator also 180° out of phase with each other and preferably 90° out of phase with the portions relating to the first plane. With the axis of rotation of the collimator thus oriented, the radiation detected is independent of the rotation of the collimator.

The third plane is determined by another tracking unit 16 or 18. Inasmuch as each tracking unit has information defining two planes, a fourth plane can as well be identified. All of this information is then preferably converted to a coordinate system in which all of the coordinates relate to a fixed datum.

The signals corresponding to the azimuth angles $\beta_1$ and $\beta_2$ as determined by respective tracking units 14 and 16 and the signals corresponding to the elevation angles $\alpha_1$ and $\alpha_2$ as determined by respective tracking units 14 and 16 may be applied to the same sort of computer as utilized in prior optical tracking systems. A block diagram of such a computer is shown in FIGURE 6, where the signals are applied to a position computer 64 which computes the position of the source relative to some reference datum, preferably the launching pad of the missile. The position is indicated in three dimensional coordinates, preferably cubic coordinates in which $x$ and $y$ are the horizontal components and $z$ the vertical component, or in spherical coordinates in which $\theta$ is the azimuth, $\phi$ is the elevation and $r$ is the range. These indications may be recorded on a recorder 66. Further, the computer may include a velocity computer 68 which comprises differentiating circuits to compute $dr/dt$, $d\theta/dt$ and $d\phi/dt$. The computer may also include an acceleration computer 70 which comprises differentiating circuits to compute $d^2r/dt^2$, $d^2\theta/dt^2$ and $d^2\phi/dt^2$.

While preferred embodiments of the invention have been shown and described, various modifications thereof are within the scope of the invention, which is limited only by the claims. For example, although a visual readout is shown and described, the read-out indication may be in the form of signals used to control the flight of the missile or to project its flight path to determine where it is going.

What is claimed is:

1. A position indicating system for tracking a body moving in spaced comprising radioactive material affixed to said body effectively producing a single source of penetrating radiation, means independent of said body and responsive to said single source of penetrating radiation for making substantially simultaneous measurements of at least three separate planes in each of which said body lies by deriving respective independent signals each systematically related to a respective one of said planes in which lies said source, and computer means for combining said independent signals to derive separate indications of three coordinates identifying the instantaneous position of said moving body in space relative to a reference datum.

2. A position indicating system for tracking a body moving in space and carrying a source for producing penetrating radiation, said system comprising means independent of said body and responsive to said source of penetrating radiation for making substantially simultaneous measurements, at least two widely separated points, of at least a total of three separate planes in each of which said body lies by deriving respective independent signals each indicative of a respective one of said planes in which lies said source, and computer means for combining said independent signals to derive separate indications of three coordinates identifying the instantaneous position of said moving body in space relative to a reference datum.

3. A position indicating system for tracking a body moving in space and carrying a source such as radioactive material that produces penetrating radiation, said system comprising at least two spaced apart tracking units independent of said body, each unit being responsive to said penetrating radiation for pointing the respective tracking unit in the direction of maximum penetrative radiation, means responsive to the direction of said tracking units for making substantially simultaneous measurements of at least three separate planes each of which lies in the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum.

4. A position indicating system for tracking a body moving in space and carrying a source such as radioactive material that produces penetrating radiation, said system comprising at least two spaced apart tracking units independent of said body, each unit being responsive to said penetrating radiation for pointing the respective tracking unit in the direction of maximum penetrating radiation, means responsive to the direction of said tracking units for making substantially simultaneous separate measurements of the azimuth and elevation of the direction of which each of said tracking units is pointing by deriving independent signals indicative thereof, and computer means for combining said independent signals to derive separate indications of three coordinates identifying the instantaneous position of said moving body in space relative to a reference datum.

5. A position indicating system for tracking a body moving in space and carrying a source such as radioactive material that produces penetrating radiation, said system comprising at least two spaced apart tracking units independent of said body and responsive to said penetrating radiation for pointing said tracking units in the direction of maximum penetrative radiation and making substantially simultaneous measurements of at least three separate planes in each of which lies the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum.

6. A position indicating system for tracking a body moving in space and carrying a source such as radioactive material that produces penetrating radiation, said system comprising at least two spaced apart tracking units independent of said body and responsive to said penetrating radiation for pointing said tracking units in the direction of maximum penetrating radiation and making substantially simultaneous measurements of at least three separate planes in each of which lies the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum, each of said tracking units comprising a directional detection unit responsive to said penetrating radiation, means for directing said detection unit in a direction where equal radiations are detected from both sides of at least one plane extending in such direction from said detection unit, and means responsive to the position of said detection unit for deriving a signal indicative of said plane.

7. A position indicating system for tracking a body moving in space and carrying a source such as radioactive material that produces penetrating radiation, said system comprising at least two spaced apart tracking units independent of said body and responsive to said penetrating radiation for pointing said tracking units in the direction of maximum penetrating radiation and making substantially simultaneous measurements of at least three separate planes in each of which lies the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum, each of said tracking units comprising a directional detection unit responsive to said penetrating radiation, first directing means for directing said detection unit in a direction where equal radiations are detected from both sides of a vertical plane extending in such direction from said detection unit, second directing means for directing said detection unit in a direction where equal radiations are detected from both sides of a plane normal to said vertical plane, and also extending in such direction from said unit, and means responsive to the position of said detection unit for deriving respective signals indicative of said vertical plane and said plane normal thereto, said signals being indicative of the azimuth and elevation, respectively, of the direction of said body relative to said unit.

8. A position indicating system for tracking a body moving in space and carrying a source such as radioactive material that produces penetrating radiation, said system comprising at least two spaced apart tracking units independent of said body and responsive to said penetrating radiation for pointing said tracking units in the direction of maximum penetrating radiation and making substantially simultaneous measurements of at least three separate planes in each of which lies the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum, each of said tracking units comprising detection means responsive to said penetrating radiation by producing detection signals systematically related to the radiation detected, collimating means disposed before said detection means for restricting the direction whence said penetrating radiation reaches said detection means, comparison means for comparing respective detection signals related to radiation reaching said detection means from opposite sides of a plane defined by said collimating means, motor means responsive to said comparison means for positioning said collimating means to make the compared signals equal, and means responsive to the position of said collimating means for deriving a signal indicative of said plane.

9. A position indicating system for tracking a body moving in space and carrying a source such as radioactive material that produces penetrating radiation, said system comprising at least two spaced apart tracking units independent of said body and responsive to said penetrating radiation for pointing said tracking units in the direction of maximum penetrating radiation and making substantially simultaneous measurements of at least three separate planes in each of which lies the direction of maximum penetrating radiation relative to one of said tracking units by deriving respective independent signals each indicative of a respective plane, and computer means for combining said independent signals to derive separate indications of three coordinates identifying the instantaneous position of said moving body in space relative to a reference datum, each of said tracking units comprising a detector responsive to said penetrating radiation by producing detection signals systematically related to the radiation detected, a collimator disposed before said detector for determining a preferred direction whence penetrating radiation can reach said detector, means for rotating said collimator about an axis angularly displaced from said preferred direction, means responsive to said detection signals for positioning said axis to make the radiation detected independent of the rotation of said collimator, and means responsive to the position of said axis for deriving at least one signal indicative of a plane containing said axis.

10. A tracking unit for tracking a body moving in space and carrying a source such as radioactive material that produces penetrating radiation, said tracking unit comprising a detector responsive to said penetrating radiation by producing detection signals systematically related to the radiation detected, a collimator disposed before said detector for determining a preferred direction whence penetrating radiation reaches said detector, means for rotating said collimator about an axis angularly displaced from said preferred direction, a reference generator coupled to said means for rotating to provide phase reference signals for said rotation, means responsive to said detection signals and said phase reference signals for positioning said axis to make the detection signals substantially equal for two portions of the rotation of said collimator 180° out of phase, and means responsive to the position of said axis for deriving a signal indicative of a plane containing said axis.

11. A tracking unit for tracking a body moving in space and carrying a source such as radioactive material that produces penetrating radiation, said tracking unit comprising a detector responsive to said penetrating radiation by producing detection signals systematically related to the radiation detected, a collimator disposed before said detector for determining a preferred direction whence penetrating radiation reaches said detector, means for rotating said collimator about an axis angularly displaced from said preferred direction, reference generating means coupled to said means for rotating to provide phase reference signals for said rotation, means responsive to said detection signals and said phase reference signals for positioning said axis to make the detection signals substantially equal for four portions of the rotation of said collimator 90° out phase, and means responsive to the position of said axis for deriving two signals each indicative of a respective one of two orthogonal planes containing said axis.

12. A tracking unit for tracking a body moving in space and carrying a source such as radioactive material that produces penetrating radiation, said tracking unit comprising a detector responsive to said penetrating radiation of said collimator 90° out of phase, and means responto the radiation detected, a collimator disposed before said detector for determining a preferred direction whence penetrating radiation reaches said detector, means for rotating said collimator about an axis angularly displaced from said preferred direction, reference generating means coupled to said means for rotating to provide phase reference signals for said rotation, means responsive to said detection signals and said phase reference signals for positioning said axis to make the detection signals substantially equal for all portions of the rotation of said collimator, and means responsive to the position of said axis for deriving two signals each indicative of a respective one of two orthogonal planes containing said axis.

13. Apparatus for tracking a body moving in space and carrying a source such as radioactive material that produces penetrating radiation, which comprises means for detecting said penetrating radiation at a detection station by producing detection signals systematically related to the radiation detected, means for collimating the penetrating radiation reaching said detection station to determine a preferred direction whence penetrating radiation reaches said station, means for rotating said preferred direction about an axis angularly displaced from said preferred direction, means for positioning said axis to make the detection signals independent of the rotation of said preferred direction, and means for deriving at least one signal indicative of a plane containing said axis.

References Cited by the Examiner

UNITED STATES PATENTS

| | | | |
|---|---|---|---|
| 2,895,670 | 7/1959 | Newell | 244—14.4 X |
| 2,930,545 | 3/1960 | Houle et al. | 244—14.4 |
| 3,028,493 | 4/1962 | Takahashi | 250—71.5 |
| 3,091,463 | 5/1963 | Cohen et al. | 250—71.5 X |

References Cited by the Applicant

Applied X-Rays, by George L. Clark, 3rd edition, McGraw-Hill Book Company, Inc., New York, 1948, pp. 139–141.

RALPH G. NILSON, *Primary Examiner.*

ARCHIE R. BORCHELT, *Examiner.*

UNITED STATES PATENT OFFICE
CERTIFICATE OF CORRECTION

Patent No. 3,291,988          Dated December 13, 1966

Inventor(s) Henry R. Chope, William R. Clore, Leonard C. Brown

It is certified that error appears in the above-identified patent and that said Letters Patent are hereby corrected as shown below:

Column 3, line 27, "wtih" should read --- with ---.
Column 6, line 65, "spaced" should read --- space ---.
Column 7, line 8, ", at least" should read --- , at at least -
Column 7, line 23, "tice" should read --- tive ---.
Column 9, line 46, "unit" should read --- units ---.
Column 10, line 4, "out phase" should read --- out of phase --
column 10, line 10, "unit" should read --- units ---; column 1
line 12, "of said collimator 90° out of phase, and means respo
should read --- by producing detection signals systematically
related ---.

SIGNED AND
SEALED
OCT 13 1970

(SEAL)
Attest:

Edward M. Fletcher, Jr.
Attesting Officer

WILLIAM E. SCHUYLER, JR.
Commissioner of Patents